US006749779B2

(12) United States Patent
Soane et al.

(10) Patent No.: US 6,749,779 B2
(45) Date of Patent: Jun. 15, 2004

(54) PRECISION INTEGRAL ARTICLES

(75) Inventors: David S. Soane, Piedmont, CA (US);
Michael R. Houston, Eagle River, WI (US); Toshiaki Hino, Berkeley, CA (US)

(73) Assignee: ZMS, LLC, Emeryville, CA (US)

( * ) Notice: Subject to any disclaimer, the term of this patent is extended or adjusted under 35 U.S.C. 154(b) by 0 days.

(21) Appl. No.: 09/952,661

(22) Filed: Sep. 14, 2001

(65) Prior Publication Data

US 2002/0055007 A1 May 9, 2002

Related U.S. Application Data

(63) Continuation of application No. PCT/US99/21754, filed on Sep. 22, 1999.
(60) Provisional application No. 60/125,377, filed on Mar. 16, 1999.

(51) Int. Cl.[7] ............................................. B29D 11/00
(52) U.S. Cl. ........................ 264/1.1; 264/1.7; 264/2.6; 264/405; 264/446; 264/494
(58) Field of Search ........................ 264/1.1, 1.7, 2.6, 264/405, 446, 494; 525/242, 243

(56) References Cited

U.S. PATENT DOCUMENTS

| 3,557,046 | A | 1/1971 | Muskat |
| 3,968,305 | A | 7/1976 | Oshima et al. |
| 4,131,625 | A | 12/1978 | Arnold et al. |
| 4,264,489 | A | 4/1981 | Ibsen et al. |
| 4,323,636 | A | 4/1982 | Chen ........................... 430/271 |
| 4,402,887 | A | 9/1983 | Kuriyama et al. |
| 4,430,417 | A | 2/1984 | Heinz et al. |
| 4,510,593 | A | 4/1985 | Daniels |
| 4,524,162 | A | 6/1985 | Domeier |
| 4,598,123 | A | 7/1986 | Cutter ........................... 525/84 |
| 4,632,773 | A | 12/1986 | Neefe ....................... 252/301.35 |
| 4,698,373 | A | 10/1987 | Tateosian et al. ............. 522/95 |
| 4,785,064 | A | 11/1988 | Hegel |
| 4,837,289 | A | 6/1989 | Mueller et al. ............. 526/279 |
| 4,981,912 | A | 1/1991 | Kurihara |
| 5,006,415 | A | 4/1991 | Matsumaru |
| 5,110,514 | A | 5/1992 | Soane |
| 5,114,632 | A | 5/1992 | Soane |
| 5,147,700 | A | 9/1992 | Bruggemann et al. ........ 428/64 |
| 5,170,192 | A | 12/1992 | Pettigrew et al. |
| 5,185,234 | A | 2/1993 | Nakatsukasa et al. |
| 5,277,911 | A | 1/1994 | Viegas et al. ............... 424/427 |
| 5,278,243 | A | 1/1994 | Soane |
| 5,372,755 | A | 12/1994 | Stoerr |
| 5,449,703 | A | 9/1995 | Mitra et al. |
| 5,723,541 | A | 3/1998 | Ingenito et al. |
| 5,747,553 | A | 5/1998 | Guzauskas |
| 5,779,943 | A | 7/1998 | Enns et al. |
| 5,830,937 | A | * 11/1998 | Shalov et al. ................ 524/297 |
| 5,851,328 | A | 12/1998 | Kohan |
| 5,907,386 | A | 5/1999 | Gupta et al. ................. 351/177 |
| 5,914,174 | A | 6/1999 | Gupta et al. ................. 428/174 |
| 5,938,876 | A | 8/1999 | Edwards et al. |
| 6,074,579 | A | 6/2000 | Greshes |
| 6,075,094 | A | 6/2000 | Amekawa ..................... 525/305 |
| 6,111,012 | A | 8/2000 | Fischer et al. |
| 6,140,450 | A | 10/2000 | Ishikawa |
| 6,225,406 | B1 | 5/2001 | Wang et al. |
| 6,241,922 | B1 | 6/2001 | Bishop |
| 6,265,499 | B1 | 7/2001 | Nagino et al. ................. 526/65 |
| 6,270,699 | B1 | 8/2001 | Fujita ......................... 264/2.7 |

FOREIGN PATENT DOCUMENTS

| EP | 0 106 641 | 4/1984 |
| EP | 0 238 863 | 9/1987 |
| EP | 0 490 448 | 6/1992 |
| GB | 498 679 | 1/1939 |
| GB | 577 432 | 5/1946 |
| GB | 2 257 978 | 1/1993 |
| WO | WO 93/21010 | 10/1993 |
| WO | WO 98/13403 | 4/1998 |
| WO | WO 00/17675 | 3/2000 |
| WO | WO 00/55653 | 9/2000 |

OTHER PUBLICATIONS

U.S. patent application Ser. No. 09/511,611, filed Feb. 22, 2000.
U.S. patent application Ser. No. 09/505,260, filed Feb. 16, 2000.

* cited by examiner

*Primary Examiner*—Jeffrey Mullis
(74) *Attorney, Agent, or Firm*—M. Henry Heines; Towsend and Towsend and Crew LLP; Jacqueline S. Larson

(57) ABSTRACT

This disclosure describes a processing approach for the rapid and efficient in-situ polymerization of specially prepared precursor mixtures to achieve near-net-shape production of objects/articles with exact dimensions. The process relies on the use of polymerizable compositions comprised of a mixture of a reactive plasticizer and an initiator, optionally also including a dead polymer, which compositions are semi-solid-like and induce little shrinkage upon curing as a result of their partially polymerized nature prior to processing. The articles of the invention have a surface and an interior core, the composition of the surface material being distinct from the composition of the core material while at the same time the surface and the core are an integral, monolithic entity. In addition, the articles are dimensionally stable and exhibit high fidelity replication.

9 Claims, No Drawings

PRECISION INTEGRAL ARTICLES

CROSS REFERENCE TO RELATED APPLICATIONS

This is a continuation of copending international patent application no. PCT/US99/21754, filed on Sep. 22, 1999, and designating the United States, which claims the benefit of U.S. provisional patent application serial No. 60/125,377, filed Mar. 16, 1999, the entire disclosures of which are incorporated herein by reference.

FIELD OF THE INVENTION

This invention is related to the fields of polymerization and near-net-shape production of precision objects. More specifically, it is related to the formation of articles having a surface composition distinct from that of the interior core material. Furthermore, it is related to the production of such objects where the surface and the core are an integral, monolithic entity and to the articles so produced.

BACKGROUND OF THE INVENTION

Numerous applications exist that require the formation of polymeric objects with a surface composition distinct from that of the core material. For example, ophthalmic lenses can be tinted to create sunglasses or photochromic lenses. Tinting involves the absorption of dye into the surface layer of the lens. The current practice is to first create a clear lens, often by grinding and polishing a lens blank into the precise shape/contour. In certain instances, injection molding can be employed to create the prescription. The finished lens is then dipped in a dye-containing solution at elevated temperatures (e.g., in near-boiling-temperature aqueous or organic solutions). High temperatures are needed to soften and dilate the lens material to allow penetration of the dye molecules into the tight plastic network constituting the lens. This tinting (dye absorption or uptake) process is slow, even under such severe conditions. The use of high temperatures can cause dye degradation (thus necessitating frequent bath replenishment) and often leads to lens warpage. Photochromic dyes are known for their tendency toward thermal degradation, making photochromic lens manufacture a difficult task. Insufficient uptake of the photochromic dye often results and this is a primary reason such lenses often do not turn sufficiently dark when exposed to sunlight. Also, since dye molecules are quite large, the crosslinks in the plastic network must be fairly loose to allow for the penetration of the dye. Additionally, the choice of dye is greatly limited by the fact that the process requires water-soluble dyes that will also be dispersible in an organic resin matrix.

Certain objects, such as eyeglasses, also often require scratch-resistant surface coatings. Presently, finished lenses can be coated with a scratch-resistant material in a dipping tank, and the scratch-resistant material is then cured. Alternatively, spin coating and spray coating can be used as deposition means. Regardless of the method of application, the scratch- or abrasion-resistant coating forms a separate layer, distinct from the existing lens. Physical interactions are relied upon to ensure (often imperfect) adhesion between the coating and the lens core, and delamination of the coating often occurs. Thus, there is a need to prepare "coated" lenses where the coating and the lens core actually form a continuous, monolithic, integrated structure. Delamination of the "coating" will therefore no longer be an issue for such lenses.

Contact lens technologies have also evolved significantly since the introduction of the lenses. Small, pre-cured, "buttons" were ground and polished to create the needed prescription. Alternatively, polymer precursors can be used to fill mold cavities, which are then cured to form the finished lenses. Here, similar to ophthalmic lenses, shrinkage accompanying cure must be accounted for in the mold design. In either case, the finished lenses can subsequently be tinted by straightforward uptake of a dye, with the accompanying problems discussed above with respect to ophthalmic lenses, or by "printing" a pattern using a variety of techniques. The printing process results in lenses mimicking the pigment distribution of a human iris. Tinting or printing (transfer printing, ink jet pattern deposition, or screen-printing) are all dictated by the dye uptake rate and strength of dye adhesion to the lens material.

In contrast to ophthalmic lenses, contact lenses must possess two additional properties. One is high oxygen permeability. The second is biocompatibility. Oxygen permeability has been found to be relatively high in soft, rubbery materials such as silicones. Silicones tend to exhibit oxygen affinity and rapid transport. Permeability is a product of diffusivity and solubility at steady state. Oxygen molecules in soft materials tend to exhibit at least high diffusivity if not high solubility as well. Block co-polymers of controlled morphology have been used to achieve high flux and dimensional stability. Morphology control is required to ensure optical transparency. Highly crosslinked silicones can also promote dimensional stability, which is necessary for precision of prescription. However, most polymers with high oxygen permeabilities do not exhibit optimal tissue biocompatibility. A certain degree of hydrophilicity is needed to give a "hydrogel-like" surface layer to ensure comfort for the lens wearer. Surface modification schemes, such as oxidation and plasma treatment have been employed to achieve some level of weftability. Such processes, however, add cost to the manufacture. Creation of a surface layer also implies possible adhesion issues of the layer to the core lens. It would be preferable to have a monolithic object with surface composition differing from the core in a controlled manner.

SUMMARY OF THE INVENTION

The present invention discloses a novel approach that overcomes the above-described intrinsic drawbacks of commercially established processes and polymeric articles. It is unique in that it is an extremely economic process suitable for mass manufacture. The present invention also discloses parts, objects, and articles produced by this method. More particularly, this invention is directed to a process for the rapid in-situ near-net-shape polymerization of semi-solid-like materials to provide macromolecular networks and articles of manufacture. The articles of the invention have a surface and an interior core, the composition of the surface material being distinct from the composition of the core material while at the same time the surface and the core are an integral, monolithic entity. In addition, the articles are dimensionally stable and precise, with very little shrinkage during the cure process. Further, the present invention discloses a new class of polymerizable materials that exhibit a semi-solid-like behavior prior to cure, an affinity for bonding to various surface compositions, low inherent shrinkage upon curing (and therefore high-fidelity replication of the mold cavity), and highly optimized engineering properties of the final object.

In one embodiment of the invention, the process includes the steps of mixing together a dead polymer, a reactive plasticizer and an initiator to give a semi-solid polymerizable core composition; optionally shaping the semi-solid core composition into a desired geometry; exposing the core composition to a surface-forming or surface-modifying composition to give a semi-solid polymerizable gradient composite material (that is, a material where the core and surface compositions are different); and exposing the polymerizable gradient composite material to a source of polymerizing energy, to give a final product with a surface that is distinct from but integral with the core, and further, exhibits dimensional stability and high-fidelity replication. The article so produced can optionally be transparent and/or have resistance to impact (resilience). The resulting macromolecular network is characterized as having either i) a semi-interpenetrating polymer network (semi-IPN) of reactive plasticizer wrapped around and within an entangled dead polymer; or ii) an interpenetrating crosslinked polymer network of reactive plasticizer within an entangled dead polymer, the reactive plasticizer polymer network being further crosslinked to the dead polymer; or iii) interpenetrating reactive plasticizer polymer chains, which may be linear, branched, etc., within an entangled dead polymer.

The reactive plasticizer may react with the dead polymer chains if the polymer has crosslinkable groups. In the presence of multifunctional monomers, two polymer networks are formed that are crosslinked together. Grafting reactions by chain transfer to the dead polymers may also occur in addition to the reactive plasticizer network formation among the dead polymers. Such systems are desirable because crosslinking of the dead polymer to the network formed by the reactive plasticizer can prevent phase separation between the two polymer networks. Thus, the dead polymers become part of the finished network having a composition that depends on the position within the object. That is, the local composition within the finished part varies from the surface to the core.

In another embodiment of the present invention, the process includes the steps of mixing together at least one reactive plasticizer, which is preferably highly viscous, and an initiator to give a semi-solid polymerizable core composition; optionally shaping the semi-solid polymerizable core composition into a desired geometry; exposing the core composition to a surface-forming or surface-modifying composition to give a semi-solid polymerizable gradient composite material (that is, a material where the core and surface compositions are different); and exposing the polymerizable gradient composite material to a source of polymerizing energy, to give a final product with a surface that is distinct from but integral with the core, and further, exhibits dimensional stability and precision. The resulting macromolecular network is characterized as a crosslinked network of reactive plasticizer.

The final product can optionally be transparent and/or resilient.

This invention permits a broad selection of reaction chemistry to achieve precision parts with the required mechanical, thermal, optical and other desired properties. Such articles exhibit superior core characteristics (such as mechanical, diffusivity, or permeability), while having desirable surface properties (such as color, tissue biocompatibility, or barrier property). It obtains precision parts that are stress-free and flawless, with little or no birefringence. Precision products can be manufactured that are very impact-resistant or that have a high oxygen permeability, low density, or other desirable but previously difficult-to-achieve characteristics.

DETAILED DESCRIPTION OF THE INVENTION

The terms "a" and "an" as used herein and in the appended claims mean "one or more".

The terms "surface-forming composition" and "interpenetrating surface-modifying composition", as used herein and in the appended claims, are interchangeable with each other and refer to any composition that adds or provides a layer having a desired characteristic to one or more surfaces of a polymer article. Compositions useful in preparing the articles of this invention can be a dye or pigment solution, which dye or pigment may be, for purposes of illustration, photochromic, fluorescent, UV-absorbing, or visible (color). Alternatively, the surface composition may contain a scratch-resistant precursor formulation. Further, a dye may be dissolved directly in a scratch-resistant material to give a finished article, such as a lens, that is tinted and scratch-protected simultaneously.

Another example of a surface-forming or surface-modifying composition is a hydrophilic monomer/crosslinker mixture, which coating may impart, for example, tissue compatibility for contact lenses or anti-fog properties for eyeglasses and windshields. This hydrophilic reactive monomer/crosslinker composition may further contain various dyes, including the photochromic variety. When dye molecules are dissolved in the surface-forming hydrophilic reactive formulation to achieve tinting and surface modification simultaneously, the range of dyes available for use is greatly expanded by the process disclosed in the present invention because (1) the treatment bath does not have to be heated excessively, allowing dyes sensitive to thermal degradation to be used; (2) the reactive precursors are mostly organic, facilitating dissolution of many dyes, in contrast to traditional tinting processes using boiling aqueous baths; and (3) the mixture can be solvent-less, minimizing health risks and environmental damage.

The "semi-solid polymerizable core composition" of the present invention, useful in the production of precision parts, comprises, in one embodiment, a mixture of a dead polymer (or a dead polymer mixture) with at least one small-molecule species, which small molecule species is itself polymerizable or crosslinkable. This small-molecule species is referred to herein and in the appended claims as a "reactive plasticizer". In another embodiment, the semi-solid polymerizable core composition comprises a reactive plasticizer or a mixture of reactive plasticizers, without the presence of a dead polymer.

The term "dead polymer" as used herein and in the appended claims refers to a fully polymerized, generally non-reactive polymer. When certain polymer chemistries are used, the dead polymer itself may also react with a reactive plasticizer, even if the dead polymer does not have unsaturated entities within or attached to the chain. The dead polymer may be linear or branched, homopolymer or copolymer. In the case of a copolymer, the sequence distribution may be random in sequence or blocky. The block copolymers may be tapered, or may have grafted side chains. The architecture of the dead polymer may be branched, multi-chain, comb-shaped or star-shaped. Di-block, tri-block or multi-block structures all fall within the scope of this invention.

The reactive plasticizer, when mixed with a dead polymer, may encompass monomers, crosslinkers, oligomeric or short polymeric reactants, or oligomeric or short polymeric crosslinkers, or macromeric reactants or macromeric crosslinkers (collectively macromers). The reactive plasticizer plasticizes the dead polymer to give a composition having the desired consistency at ambient temperature or below (i.e., able to maintain a shape for easy handling over short time periods), and at the processing temperature (i.e., malleable enough to be compressed or formed into a desired shape). The said processing temperature can be chosen conveniently to be moderately above or below ambient temperature.

When used without a dead polymer or with only a small amount of dead polymer, the reactive plasticizer should be a reactive oligomer or a reactive short polymer, having at least one reactive functional group. In this case, the reactive plasticizer should be a longer chain molecule, of from about 1 to about 1000 repeat units, and preferably between about 1 and about 100 repeat units. These reactive plasticizers (or mixture of reactive plasticizers) have a high viscosity, preferably of greater than 1000 centipoise, at the temperature at which the material is to be handled (e.g., inserted into a mold cavity) to exhibit semi-solid behavior. In the case of low molecular weight reactive plasticizers, the mixture may first be slightly polymerized to create the semi-solid consistency required for downstream processing as disclosed in this invention. Alternatively, the mixture may be cooled to create the semi-solid consistency.

The reactive plasticizers can be mixtures themselves, and composed of mono-functional, bi-functional, tri-functional or multi-functional entities.

In total, the amount and composition of the reactive plasticizer in the resulting formulation are such that the formulation is semi-solid-like and can be effectively handled with no need for a gasket in the mold. That is, the reactive plasticizer is present in concentrations sufficient to allow malleability and moldability at the desired processing temperature and pressure; however, the mixture is non-dripping and not free-flowing over short time periods at the material storage temperature and mold closure temperature, which can be conveniently chosen to be at ambient temperatures, or slightly above or below. The amount of reactive plasticizer is generally about 0.1% to about 100% by weight, preferably from about 1% to about 50%, more preferably from about 3% to about 25%. When the reactive plasticizer is an oligomeric or short polymeric reactant or crosslinker, the amount of reactive plasticizer may, preferably, be from about 50% to 100% by weight, more preferably from about 75% to 100% by weight.

The types and relative amounts of reactive plasticizer and dead polymer will dictate the time and temperature-dependent visco-elastic properties of the mixture. The visco-elastic properties of the chosen compositions may be wide and varied. For the practice of the invention as disclosed herewith, it is only required that the composition be highly, viscous, semisolid or solid-like for handling and/or insertion into a mold assembly at some temperature, while being semi-solid or liquid-like (i.e., deformable) at the processing temperature to which the mold assembly is heated or cooled after closure. Since virtually all known material systems become more compliant upon heating, the molding temperature will usually, but not necessarily, be equal to or higher than the handling temperature. In principle, any reactive plasticizer system (with or without dead polymer) which can be handled as a semi-solid or solid at some temperature, and which can be made to conform to a desired geometry (with or without changing the temperature and/or using force), can be used for the practice of the invention.

By "semi-solid" and "semi-solid-like", as used herein and in the appended claims, are meant that, in essence, the polymerizable core composition is a rubbery, taffy-like mass at sub-ambient, ambient, or elevated temperatures. Preferably the semi-solid mass has a sufficiently high viscosity to prevent dripping at ambient temperatures and pressures or below, but is malleable and can easily deform and conform to mold surfaces if the mold cavity is slightly heated or as a result of pressure exerted by pressing the two mold halves together, or a combination of both heat and pressure. This mass can be pre-formed into a slab or disk or other convenient or desirable shape. For example, the discharge of the core composition material from a mixing device can be sliced (at low temperatures if necessary) or squeezed into flat disks, slabs or sheets, which may in turn be pressed between mold halves to define a lens or other object without an intervening gasket. Alternatively, discrete globs of the discharge can be pressed into molds having the approximate shape of the ultimate object. A glob of this composition can be applied at slightly elevated temperature on one side of a mold cavity. The other mold half is then brought into contact with the semi-solidified mass, which is squeezed into the desired shape by the approaching mold halves. Again, there is no need for gasketing of the mold halves, as the composition will not leak out of the mold due to its viscous semi-solid-like nature (except that which is squeezed out in clamping the mold shut). Furthermore, the shaped mass may be kept at a slightly elevated temperature after mold closure to anneal away the stresses (birefringence), if any, introduced by squeezing. The resulting units (whether slabs, disks, sheets, or other molded objects, for example) are cooled, without curing or with only slight or partial curing, for storage after slicing, squeezing or pressing.

When needed, the stored "pre-forms", that is the semi-solid core composition units described above, are retrieved and are dipped into a bath of or otherwise exposed to a surface-forming composition for the desired surface characteristic. In addition to dipping in a bath, the surface-forming materials may be vaporized on, painted on, sprayed on, spun on, printed on, or transferred onto the pre-forms by processes known to those skilled in the art of coating and pattern creation/transfer. Even in dipping, the pre-forms can be partially immersed to give a gradient-tint appearance. Such treatments cannot be accomplished (at least not easily accomplished) when a gasketed mold assembly has to be employed to confine a traditional viscous core-forming liquid formulation before cure, as has been necessary prior to this invention. Because the pre-forms are not cured at this point in the process, they act like sponges and there is great penetration and diffusion of the surface-forming composition into the core material. The amount and depth of surface-forming composition absorbed can be controlled by methods known in the art, such as, for example, concentration of the surface composition applied to the pre-form, length of time of exposure of the pre-form to the composition, temperature of the composition, and the like. The amount and depth of surface-forming composition absorbed can also be controlled by partially pre-curing the semi-solid core composition units before exposure to the surface-forming composition. Such a partial pre-cure will tend to reduce but not stop the penetration of the surface-forming entities into the core material.

After the pre-form is exposed to the surface-forming composition, the resulting semi-solid "gradient composite material" (that is, the resulting material where the core and surface compositions are different) is pressed between mold halves (again, without the necessity of an intervening gasket) or otherwise shaped to define the desired final object. Alternatively, the surface-forming composition may be sprayed, painted, printed, patterned, flow-coated, or otherwise applied to one or more surfaces of a mold. The surface forming composition may optionally be cured or partially cured to increase viscosity, toughness, abrasion resistance or other desired properties. The semi-solid polymerizable preform is placed into the prepared mold, after which the mold may be clamped shut forming a semi-solid gradient composite material shaped into the desired geometry. The system (for example, the front mold, the semi-solid gradient composite material, and the back mold) is then exposed to a source of polymerizing energy (such as UV or infrared light, heat, γ-ray radiation, microwave, e-beam radiation, and the like) to trigger network formation (curing). Complex polymerization schemes (zone-curing, for example) are not necessary in the present process. The material of the invention can be cured by blanket UV radiation, for example, without significant shrinkage or distortion of the final product.

In the core composition, the reactive plasticizers upon cure set up a semi-interpenetrating polymer network within an entangled dead polymer network after curing. In some cases, the reactive plasticizer may react with groups on the dead polymer chain to form completely crosslinked networks. If only mono-functional reactive plasticizers are used, linear polymeric chains may be formed among the dead polymer chains. This arrangement will generally not be preferred over the crosslinked network for the production of transparent parts because uncrosslinked polymers tend to phase separate over time (kinetically limited), except in rare cases of compatibility between two or more polymeric phases. Mixtures containing only mono-functional reactive plasticizers will often react slightly with the dead polymer chains (even when no crosslinkable side groups are present on the dead polymer), desirably producing a slightly crosslinked network having sufficient stability to prevent phase separation over time periods of interest. When a non-transparent finished part is the objective, then the above limitations are relieved.

Certain of the surface-forming compositions simply absorb or flow into the loose sponge-like architecture of the uncured or partially cured pre-form and are subsequently trapped within the resulting tight, polymerized network when the core composition is cured completely. In other instances, the surface-forming composition is itself polymerizable and forms an interpenetrating polymer network structure with the core when the two compositions are cured. In either case, the surface treatment is locked in, either chemically, physically, or both, giving a final product where the core and the surface are integral and monolithic.

Optimization of engineering properties can be accomplished by the judicious design and/or selection of the reactive molecules, their concentration and composition.

Any UV or thermal free-radical initiator known to those skilled in the art for free-radical polymerization can be used to initiate the polymerization process. Mixtures of initiators are sometimes preferred since they can in certain cases provide a more efficient production of radicals. The initiator should, preferably, have a broad absorption spectrum if it is a UV initiator, have good curing efficiency, and be non-yellowing. Optionally, other additives may be added in small amounts to either the dead polymer mixture or the surface-forming compositions, such as mold release agents to facilitate removal of the object from the mold after curing, non-reactive conventional plasticizers or flexibilizers, pigments, dyes, organic or inorganic fibrous or particulate reinforcing or extending fillers, thixotropic agents, indicators, inhibitors or stabilizers (weathering or non-yellowing) agents, UV absorbers, surfactants, flow aids, chain transfer agents, and the like.

For example, it may be desirable to provide a semi-solid mixture containing one or more UV initiators, which has been pre-formed into a puck suitable for eye-glass lens production. This composition may then be exposed or coated on one or more sides with a scratch-resistant surface-forming composition containing one or more thermal initiators and a UV-absorbing substance to form a monolithic composite article having a surface composition unique from that of the core. Once pressed into the desired shape in the mold, the composite article may be exposed to UV light from the back, while being heated slightly, allowing the core material to be cured by the polymerizing energy of the UV light and the integral surface layer to be cured by heat. The resulting object is an eyeglass lens having good dimensional stability (high-fidelity replication of the mold cavity shape), a scratch resistant outer surface, and inherent UV absorption for the protection of the wearer.

In case the edges of the finished parts require dimensional precision, then a precisely matched (or measured) amount of the pre-form is used. The front and back mold halves can be fashioned in such a way as to allow precise telescopic fit of one within the other. During mold closure, excess material (if any) can overflow the tiny annular region and be easily trimmed off after cure. If the amount of mass discharged into the mold cavity is measured very precisely, such flash can be eliminated altogether for repetitive production of identical finished objects.

If the surface layer has a different refractive index from the core, then for optical applications the pre-forms should have smooth surfaces, so that no optical aberrations are observed in the finished objects. Since the pre-forms can already approximate the final shape, slight stretching and squeezing experienced in the final molding step and in-mold cure will not unduly distort the surface layer.

If the reactive plasticizers can be designed to conservatively exhibit a total shrinkage in the neighborhood of 8% when cured in their pure state, then a mixture containing less than 50% of such plasticizers in dead polymers will give only a very small (less than 4%) total shrinkage, assuming linear property additivity. This amount of total shrinkage is manageable by most curing regimens, including blanket UV exposure (for photo-cure) and rapid temperature spikes (for thermal-cure). In certain realistic cases, the intrinsic shrinkage of oligomeric reactive plasticizers may be 5%, yet the maximum amount used in the dead polymer formulation for plasticization may be only 10% by weight, giving rise to a system than shrinks approximately 0.5%. In certain other realistic cases, the intrinsic shrinkage of small molecule reactive plasticizers may be 10%, yet the maximum amount used in the dead polymer formulation for plasticization may be only 5% by weight, again giving rise to a system than shrinks approximately 0.5%.

Even in the case where 50–100% reactive plasticizers are present, low shrinkage may be realized because the system is not now limited to non-viscous, flowable components. In the prior art, material systems were limited by low-viscosity requirements, which inherently translates to systems possessing a high population of reactive entities and therefore exhibiting large shrinkage upon cure. Because low viscosity is no longer a requirement with the practice of the present invention, semi-solid material systems with high viscosity, optionally high molecular weight, and inherently low shrinkage may now be utilized.

The molding compositions of the invention thus display low shrinkage upon cure. By "low shrinkage" is meant that the composition will shrink during cure by typically less than 5%, preferably less than 2%. This benefit enables molding processes in which the fabricated part shows high replication fidelity of the mold cavity. That is, because shrinkage of the polymerizable formulation is quite small, the cured part will retain the shape of the mold cavity throughout cure. Problems associated with shrinkage such as premature mold release, which greatly hinder and complicate current state-of-the-art practices, are eliminated. Such low shrinkages will greatly facilitate the processing of integral surface-core articles as the parts will not shrink sufficiently to distort the surface layer during cure. Note that the present invention can also be practiced with other types of polymerizable systems, such as those initiated with ionic initiators, microwaves, x-rays, e-beams, or gamma radiation. In addition, condensation, ring-opening and other polymerization mechanisms may be similarly practiced.

The high replication fidelity achieved with the invention disclosed herewith may be appreciated in the casting of optical components which rely on precise, smooth surfaces such as ophthalmic lenses, contact lenses, prisms, optical disks and the like. High fidelity replication may be also appreciated in the molding of components which rely on surfaces having desired exact topographies, such as printing plates or other pattern transfer media. High replication fidelity may be further appreciated in the molding of three dimensional or complex geometry components which require dimensionally precise replication from the mold such as couplers, housings, gears, various packaging assemblies, and the like.

It should be appreciated that the cross-linked interpenetrating polymer networks formed during the practice of the invention disclosed herewith provide continued dimensional precision (i.e., dimensional stability) during the use or operation of the molded part, That is, the cross-linked networks do not flow when heated above their glass transition temperature, and provide improved resistance to chemical attack, repeated load cycles, and the like. The benefits of dimensional stability achieved with the practice of the invention will be appreciated by fabricators of all types of moldable objects which may benefit from precise geometries.

Another beneficial characteristic of the present invention is that free radical polymerization and other triggerable chain polymerization mechanisms (e.g., via the use of ionic initiators) proceed efficiently in semi-solid media because of reduced oxygen inhibition and slow termination reactions. Without being bound by theory, this is believed to be due in part to the decreased mobility of oxygen molecules in high-viscosity media. In addition, oxygen-scavenging additives can be incorporated into the polymerizable mixture prior to initiation of cure. Thus, semi-solid polymerizable mixtures allow processing in which the need for nitrogen purging during mixing and molding steps is reduced. Curing reactions will also proceed further to completion in the near-surface region of the object even when oxygen is present in the gas phase surrounding the object to be cured, thus reducing or eliminating the need for oxygen barrier layers at the surface of the molded part.

Yet another beneficial characteristic of the disclosed invention is that thermal spikes produced by the polymerization of unsaturated species are mitigated. Conventional casting processes utilize low-viscosity systems, which contain near 100% reactive components. Such systems experience temperature spikes due to the exothermic curing reaction. When the entire part is irradiated and cured at once, part temperatures can increase rapidly by up to 200° C. over the part temperature prior to cure initiation. Such temperature excursions lead to thermal degradation, discoloration, premature mold release, and part warpage upon being released from the mold due to thermal expansion-contraction effects.

The semi-solid-like nature of the polymerization mixture disclosed here greatly reduces such temperature spikes because the proportion of reactive components in the system is typically less than 50% by weight, and preferably less than 25% by weight. Thus, a mixture with only 25% by weight of the reactive plasticizer component will rise at most approximately 50° C. Such temperature rises are easily withstood by most material formulations, and further, such a small temperature excursion precludes part warpage after mold release. Even when the amount of reactive plasticizer is above 50%, the semi-solid compositions will typically possess a low population of reactive entities, thus mitigating high temperature excursions and associated problems.

This process enjoys the benefits of (1) material formulation flexibility, (2) finished parts being thermosets with interpenetrating networks or slightly crosslinked networks, (3) room temperature or slightly elevated temperature processing, (4) UV curing (photo-polymerization) that is not limited by heat transfer time or long cycle time, (5) efficient, low-oxygen-inhibited polymerization carried out in semi-solid media, (6) minimal temperature rise due to exothermic reactions, (7) low pressure operation, and (8) either continuous process or batch-wise operation with an intermediate step of casting from pre-forms (e.g., disks, slabs or pucks).

The ingredients in the semi-solid polymerizing mixture can be blended by hand or by mechanical mixing. The ingredients can preferably be warmed slightly to soften the dead polymer component. Any suitable mixing device may be used to mechanically homogenize the mixture, such as blenders, kneaders, extruders, mills, in-line mixers, static mixers, and the like, optionally blended at temperatures above ambient temperature, or optionally blended at pressures above or below atmospheric pressure.

In one preferred embodiment of the invention, an optional waiting period may be allowed during which the ingredients are not mechanically agitated. The optional waiting period may take place between the time the ingredients are initially metered into a holding container and the time at which they are homogenized mechanically or manually. Altematively, the ingredients may be metered into a mixing device, said mixing device operated for a sufficient period to dry-blend the ingredients, then an optional waiting period may ensue before further mixing takes place. The waiting period may extend for an hour to one or more days. The waiting period may be chosen empirically and without undue experimentation as the period which gives the most efficient overall mixing process in terms of energy consumption. This embodiment of the invention may be particularly beneficial when the polymerizable mixture contains a high fraction of the dead polymer ingredient, especially when the dead polymer is glassy or rigid at ambient temperatures. Utilization of a waiting period may also be particularly beneficial when the dead polymer is thermally sensitive and so cannot be processed over an extended time at temperatures above its softening point without undue degradation.

Two example process schemes are discussed below. Numerous variants can be envisioned by those skilled in the art of polymerization reaction engineering and polymer processing and molding. Hence, the present invention is not limited by these two example processing embodiments.

Batchwise processing provides precision-casting from pre-forms. A dead polymer and a reactive plasticizer (or, alternatively, a reactive plasticizer with sufficient viscosity alone), together with an initiator package (optionally including other additives such as anti-oxidants, stabilizers, and the like) are mixed together (optionally with a waiting period during which the ingredients are not mechanically agitated) in a mixer equipped with temperature control and vacuum capabilities, to form a semi-solid polymerizable core composition free of dust particles, voids, or bubbles. The semi-solid core composition is discharged from the mixer and optionally shaped into a desired geometry. In a presently preferred embodiment, the discharge is cast into slabs (disks, pucks, and the like) that serve as preforms for the subsequent precision casting operation. Alternatively, an extruded strand of the semi-solid composition can be sliced or diced into pre-forms. The core composition is then exposed to a surface-forming (or surface altering) composition for a specified period of time to form a semi-solid gradient composite material. Where the semi-solid core composition has been shaped into pre-forms, for example, the pre-forms may be stored at room temperature or refrigerated temperatures in the interim, and then, in a downstream operation, can be retrieved and exposed to the surface-forming composition.

The duration of the exposure, the concentration of the surface-altering species in the bath, and the diffusivity of the surface-altering species in the semi-solid composite article will determine the depth of penetration of the surface-altering species within the semi-solid core composition. The surface-altered gradient composite material, preferably as a pre-form, is then shaped into the desired geometry for production of the final composite article. In a presently preferred embodiment, a surface-altered gradient composite pre-form is sandwiched between mold halves, whereupon the mold is closed, briefly heated to enhance material compliance as necessary and to anneal away any stresses, and flood-exposed by UV or heat-cured or otherwise exposed to a source of polymerizing energy. One can envision this processing scheme to suit just-in-time production situations, where an inventory of pre-forms can be used to make precise parts upon demand. In situations where a large variety of parts must be made just-in-time, this approach offers great ease of material handling. Eye glass lenses having a large range of prescriptions constitute one such example where this batchwise process scheme is appropriate.

In an alternative, continuous process, the dead polymer and the reactive plasticizer (or, alternatively, the reactive polymer alone), and the initiator package (optionally including other additives such as anti-oxidants, stabilizers, and the like) are mixed together in an extruder. There is optionally a waiting period prior to the material being introduced into the extruder, during which time the ingredients are in intimate contact with one another, but are not mechanically agitated. Periodically, the extruder discharges a fixed amount of semi-solid reactive plasticizer-dead polymer core composition as a warm glob into a temperature-controlled mold cavity. The mold, which exhibits a telescopic fit of the front/back mold assembly, is then closed. An optional waiting period may ensue at the still-elevated temperature to anneal away any stresses induced by squeezing of the glob. When the part has taken on the precise shape of the mold cavity, the mold is momentarily opened and the core composition is exposed (by dipping, spraying, vapor immersion, etc.) to the surface-modifying or surface-forming material. The mold with the resulting gradient composite system is then closed or otherwise reassembled. Finally, the captured gradient composite material is flood-exposed by UV or heat-cured or otherwise exposed to a source of polymerizing energy. This second example process flow is best suited for situations where the number of different parts is small, but each part is mass manufactured into many copies. Precision optics constitute one potential application area, as well as many engineering parts with intricate geometries found in sporting goods, automotive, construction, and aerospace industries, for example. In yet another example, an extruded sheet can be sprayed from both sides with a scratch-resistant formulation, the formulation having sufficient time to soak into the core material, then cured in a conveyer belt fashion to give an integral surface-core composition.

Each of the processing examples described above could be easily altered to accommodate a gasket-less, in-mold coating process as well. In this scheme, one or more surfaces of the mold are coated (e.g., printed, patterned, sprayed, etc.) with the surface-forming composition prior to insertion of the semi-solid polymerizable mass. After the surface-forming composition has been applied to one or more mold surfaces, but before the insertion of the semi-solid mass into the mold, the composition may optionally be cured or partially cured to increase viscosity, toughness, abrasion resistance or other desired properties. If pre-forms are to be used, they can be placed into the mold, sandwiched between mold halves, briefly heated to enhance material compliance as necessary and to anneal away any stresses, and flood-exposed by UV or heat-cured or otherwise exposed to a source of polymerizing energy. Because the pre-forms are not free-flowing when inserted into the mold, turbulent or non-uniform flow patterns will not develop between the semi-solid polymerizable core material and the in-mold coating composition (as is often the case when viscous organic liquid compositions are used to form the polymerizable core material). Yet, because the semi-solid polymerizable mixture is soft and spongelike prior to being fully cured, it will effectively and uniformly merge with the in-mold coating material (even when partially or mostly cured) once the mold is closed, to form an integrated article with a smooth transition between the surface composition and the core material.

The present invention provides several process innovations, including fast absorption of dyes and other surface-forming materials, use of a wide range of dyes, integral surface modification, easy use of in-mold coatings, full cure of surface and core in one step, a gasket-less process, and manufacture of pre-forms that are storable and useable upon demand.

Many applications can be found where an integral object with precise dimensions is required. In these cases, the utility of the object hinges on its superior core characteristics (such as mechanical properties, diffusivity, or permeability), while having desirable surface properties (such as tissue biocompatibility, color, or barrier properties). Examples of unique products of this invention include, but are not limited to:

Contact lenses with hydrophobic cores and hydrophilic surfaces that are integrally bonded together and have high oxygen permeability.

Contact lenses with dyes firmly entrapped in the surface layer, including blue-tinted lenses that have been difficult to manufacture by previous methods.

Contact lenses with photochromic characteristics, to protect the eye against UV damage, which lenses have not previously been manufactured.

Eyeglass lenses with scratch-resistant and/or UV-absorbing coatings that form an integral part with the lens core and will not delaminate.

Tinted eyeglass lenses and photochromic eyeglass lenses where the dyes are firmly entrapped and will not diffuse out. Present conventional practice cannot achieve this.

Projection television lenses or optical elements that are tinted and possess a scratch-resistant surface composition integral with the elements or lenses themselves.

Shatter-resistant windows and windshields that also possess scratch-resistant surfaces, where the surface layer is an integral part of the total piece.

Shatter-resistant windows and windshields that also possess anti-static surfaces that resist static charge build-up and/or dust collection.

Eyeglasses, windows, windshields, television screens and other optical elements that have low reflectivity, for anti-glare applications.

Eyeglasses, windows, windshields, television screens and other optical elements that have fluorescent or phosphorescent coatings for providing articles with enhanced optical brightness.

Eyeglasses, windows, windshields, television screens and other optical elements that have surface layers possessing additional reactive groups such as amines, anhydrides, alcohols, carboxylic acids, epoxies, or other chemically reactive species, for promoting adhesion of subsequent films or coatings.

Medical prosthesis devices with a core that gives dimensional stability and/or mechanical performance and an integral shell that provides bio-compatibility.

Implants and controlled-release (sustained-release) delivery vehicles for drugs.

Objects with non-wetting characteristics; that is, the object will be difficult to swell in either water or oil.

Objects with low-friction or high-lubricity surfaces integral with the object.

Surface-Forming or Surface-Modifying Materials

Surface-forming materials for the purpose of scratch resistance enhancement can be selected from multifunctional crosslinkers that are compatible with the reactive plasticizers of the core composition, so that they will react together to form the monolithic final product. By compatible in this sense we mean that the surface formulation may preferably inter-react with the reactive groups present in the core. Formulations used for imparting scratch resistance will often consist of one or more highly functional (i.e., functionality equal to or greater than 3) reactive species. Polymerization of such highly functional species in the near-surface region of the composite article will produce a tightly crosslinked, scratch-resistant outer layer that is monolithically integrated with the core composition. Examples of such crosslinkers include, but are not limited to, triacrylates and tetraacrylates, and the ethoxylated or propoxylated versions of these multi-functional acrylates. Occluded nano-particles in the surface formulation can also impart exceptional scratch resistance. Those skilled in the art of nano-composites can readily adapt the present invention for use with the nano-composite literature.

When the surface-forming material is selected to provide hydrophilicity, the material may be selected from, but is not limited to, hydrophilic polar monomers and crosslinkers such as hydroxyethyl methacrylate (HEMA) or glycol methacrylate (GMA), hydroxyethyl acrylate, acrylic acid, polyethylene glycol acrylate, and any of the sugar acrylate or methacrylate esters, acrylamides, or methacrylamides, vinyl acetate, vinyl pyrrolidone, and the like.

Photochromic dyes useful as the surface-forming material are discussed in the following references: "Organic Photochromes", A. V. Elstsov, ed., Consultants Bureau Publishers, New York and London, 1990; "Physics and Chemistry of Photochromic Glasses", A. V. Dotsenko, L. B. Glebor, and V. A. Tsekhomsky, CRC Press, Baton Rouge and New York, 1998; "Photo-Reactive Materials for Ultrahigh Density Optical Memory", M. Irie, ed., Elsevier, Amsterdam and New York, 1994. The dyes may themselves possess reactive groups that chemically lock them into the near-surface region of the object, or the dyes may be entirely inert. In the latter case, the dyes will be held in the surface region of the object by the densely crosslinked network surrounding the dye molecules after polymerization.

Low refractive-index monomers and crosslinkers may be used as the surface-forming composition to provide low reflectivity (for anti-glare applications, for example), low friction (or high lubricity), and/or non-wetting, hydrophobic characteristics. Such compositions include vinyl or (meth) acrylated silicones, as well as perfluorinated or partially fluorinated acrylates and methacrylates and vinyl ethers, such as for example vinyl trifluoroacetate, trifluoroethyl acrylate, pentadecafluorooctyl acrylate, hexafluorobutyl methacrylate, perfluoroethyleneglycol diacrylate, and the like. These perfluorinated compounds may also enchance mold-release properties of the final product, as do silicone acrylates.

The process of the present invention allows the choice of dyes for tinting to be greatly expanded over that of the prior art methods. Dyes sensitive to thermal degradation may be utilized as the surface-forming composition, as may dyes that dissolve in organic media. Many commercially available dyes from sources such as Ciba Geigy, Aldrich, BASF, DuPont, etc., are soluble in organic media. Aqueous-phase soluble dyes are also possible candidates for this invention by using surface formulations that are polar or charged, or simply by dissolving the dyes in an inert, polar media (e.g., water, ethanol, ethylene glycol, acetone, etc.) which facilitates their uptake into the article prior to cure.

Anti-static monomers or inert additives may be used as the surface-forming composition to provide anti-static-charge surfaces in lenses or other optical parts, windows, and the like. The anti-static surfaces minimize the collection of dust particles, increasing optical transmission and clarity and decreasing the need and frequency of cleanings. Reactive and inert anti-static additives are well known and well enumerated in the literature.

The surface-forming composition may also consist of or include certain chemicals that exhibit fluorescence or phosphorescence. Inert, non-reactive fluorescent or phosphorescent entities are physically entrapped in the near-surface region of the object upon polymerization. Alternatively, fluorescent or phosphorescent entities containing reactive sites will be chemically incorporated into the composite article. These fluorescent or phosphorescent compounds enhance the optical brightness or can mask yellowing of the composite article. Examples of such compounds are sold by Ciba under the trade names Uvitex® OB and Tinopal® SFP.

Heterofunctional additives may be used as the surface-forming composition for incorporation into the near-surface region of the semi-solid composite article. These heterfunctional additives may then serve as future reactive sites or as adhesion promoters for subsequent films or coatings. For example, mono-acrylated epoxies, hydroxyacrylates, amino-vinyl ethers, or vinyl anhydrides may be chemically incorporated into the surface region(s) of the composite article by reaction of the vinyl groups. The epoxy, hydroxy, amino, or anhydride groups may then be used to capture, react with, and/or promote adhesion of subsequent films or coatings using chemical reactions other than the vinyl-based polymerization.

Anti-oxidant or free-radical scavenging compounds may also be included in the surface-forming composition to enhance weatherability (and therefore long-term optical performance) of the final composite article. Examples of such compounds are those sold by Ciba under the Iraganox® tradename series.

Example UV-absorbing substances may include, for example, zinc oxide nano-particles with diameters ranging from 80–120 nm.

Core Composition Material Design Considerations

In one embodiment of the present invention, the core material is a combination of dead polymers with monomeric or oligomeric reactive diluents. These reactive diluents, when used in small amounts, actually serve the role of plasticizers. Instead of inert plasticizers that simply remain in a plastic to soften the material, the reactive diluents/plasticizers can initially soften the polymer to facilitate uptake of the surface-altering composition and to facilitate the molding process (allowing for lower temperature molding processes compared with the processing of conventional, unplasticized thermoplastic materials); but, upon curing, the polymerized reactive plasticizers lock in the precise shape and morphology of the polymer (and also lock in the reactive plasticizers themselves, as well as the surface-altering components, so that they cannot leak or be leached out of the material over time). Once polymerized, the reacted plasticizers no longer soften the material to the same extent as before curing. At the same time polymerization results in no significant shrinkage (due to the overall low concentration of the reactive plasticizers), so the finished objects remain dimensionally stable, yielding high-fidelity replication of the mold cavity and aberration-free surface-core articles.

Subsequent discussions concerning the basic material design considerations are divided into two categories, based on the type of dead polymer utilized in the process. One category begins with standard thermoplastics as the dead polymer. These include, but are not limited to, polystyrene, polymethylmethacrylate, ABS, polyvinyl chloride, polyvinylidene chloride, polycarbonate, polysulfone, polysiloxane, polysilane, polyvinylpyrrolidone, polycaprolactone, and polyetherimide, for example. The thermoplastics may optionally have small amounts of reactive entities attached (copolymerized, grafted, or otherwise incorporated) to the polymer backbone to promote crosslinking upon cure. They may be amorphous or crystalline. They may be classified as engineering thermoplastics, or they may be biodegradable. These examples are not meant to limit the scope of compositions possible during the practice of the current invention, but merely to illustrate the broad selection of dead polymer chemistries permitted under the present disclosure. Reactive plasticizers may be mixed with a thermoplastic polymer such as those listed above to give a semi-solid-like composition that can be easily molded into dimensionally precise objects. Upon curing, the dimensional stability of the object is locked in to give exact three-dimensional shapes or precise surface features. Thermoplastic polymers may be chosen in order to give optical clarity, high index of refraction, low birefringence, exceptional impact resistance, good thermal stability, high oxygen permeability, UV transparency or blocking, low cost, or a combination of these properties in the finished, molded object.

The other category utilizes "thermoplastic elastomers" as the dead polymer. An exemplary thermoplastic elastomer is a tri-block copolymer of the general structure "A-B-A", where A is a thermoplastic rigid polymer (i.e., having a glass transition temperature above ambient) and B is an elastomeric (rubbery) polymer (glass transition temperature below ambient). In the pure state, ABA forms a microphase-separated morphology. This morphology consists of rigid glassy polymer regions (A) connected to and surrounded by rubbery chains (B). Under certain compositional and processing conditions, the morphology is such that the relevant domain size is smaller than the wavelength of visible light. Hence, parts made of such ABA copolymers can be transparent or at worst translucent. Thermoplastic elastomers, without vulcanization, have rubber-like properties similar to those of conventional rubber vulcanizates, but flow as thermoplastics at temperatures above the glass transition point of the end blocks. Melt behavior with respect to shear and elongation is similar to that of conventional thermoplastics. Commercially important thermoplastic elastomers are exemplified by SBS, SIS, SEBS, where S is polystyrene and B is polybutadiene, I is polyisoprene, and EB is ethylenebutylene copolymer. Many other di-block or tri-block candidates are known, such as poly(aromatic amide)-siloxane, polyimide-siloxane, and polyurethanes. SBS and hydrogenated SBS (i.e., SEBS) are well-known products from Shell Chemicals (Kraton®). DuPont's Lycra® is also a block copolymer.

When thermoplastic elastomers are chosen as the starting dead polymer for formulation, exceptionally impact-resistant parts may be manufactured by mixing with reactive plasticizers. The thermoplastic elastomers, by themselves, are not chemically crosslinked and require relatively high-temperature processing steps for molding which, upon cooling, leads to dimensionally unstable, shrunken or warped parts. The reactive plasticizers, if cured by themselves, may be chosen to form a relatively glassy, rigid network, or may be chosen to form a relatively soft, rubbery network. When thermoplastic elastomers and reactive plasticizers are blended together, they form flexible networks with superior shock-absorbing and impact-resistant properties. By "impact-resistant" is meant resistance to fracture or shattering upon being struck by an incident object. Depending on the nature of the dead polymer and reactive plasticizers used in the formulation, the final cured material may be more stiff or more stretchy than the starting dead polymer. Composite articles exhibiting exceptional toughness may be fabricated by using a thermoplastic elastomer which itself contains polymerizable groups along the polymer chain, such as SBS tri-block copolymers, for example.

Furthermore, when compatible systems are identified, transparent objects can be cast. "Compatibility" refers to the thermodynamic state where the dead polymer is solvated by the reactive plasticizers. Hence, molecular segments with structural similarity would promote mutual dissolution. Aromatic moieties on the polymer generally dissolve in aromatic plasticizers, and vice versa. Hydrophilicity and hydrophobicity are additional considerations in choosing the reactive plasticizers to mix with a given dead polymer. Even when only partial compatibility is observed at room temperature, the mixture often becomes uniform at a slightly increased temperature; i.e., many systems become clear at slightly elevated temperatures. Such temperatures may be slightly above ambient temperatures or may extend up to the vicinity of 100° C. In such cases, the reactive components can be quickly cured at the elevated temperature to "lock-in" the compatible morphology before system cool-down. Hence, both material and processing approaches can be exploited to produce optically clear parts. Optically clear and dimensionally rigid parts have a wide range of potential applications. Both polycarbonate and thermoplastic elastomers can be employed to create useful formulations by mixing with suitable reactive plasticizer packages. With the process innovation described herewith, powerful new material systems can be developed.

A preferred formulation for developing optically clear and high impact-resistant materials uses styrene-rich SBS triblock copolymers that contain up to about 75% styrene. These SBS copolymers are commercially available from Shell Chemicals (Kraton®), Phillips Chemical Company (K-Resin®), BASF (Styrolux®), Fina Chemicals (Finaclear®), and Asahi Chemical (Asaflex®). In addition to high impact resistance and good optical clarity, such styrene-rich copolymers yield materials systems which preferably exhibit other desirable properties such as high refractive index (that is, the index of refraction is greater than 1.499) and low density. These properties are especially preferred for ophthalmic lenses as it allows the production of ultra thin, light-weight eyeglass lenses which are desirable for low-profile appearances and comfort of the wearer.

Alternatively, elastomers, thermosets (e.g., epoxies, melamines, acrylated epoxies, acrylated urethanes, etc., in their uncured state), and other non-thermoplastic polymeric compositions may be desirably utilized during the practice of this invention.

The reactive diluents (plasticizers) can be used singly or, alternatively, mixtures can be used to facilitate dissolution of a given dead polymer. The reactive functional group can be acrylate, methacrylate, acrylic anhydride, acrylamide, vinyl, vinyl ether, vinyl ester, vinyl halide, vinyl silane, vinyl siloxane, (meth)acrylated silicones, vinyl heterocycles, diene, allyl and the like. Other less known but polymerizable functional groups can be investigated, such as epoxies (with hardeners) and urethanes (reaction between isocyanates and alcohols). In principle, any monomers may be used as reactive plasticizers in accordance with the present invention, although preference is given to those which exist as liquids at ambient temperatures or slightly above, and which polymerize readily with the application of a source of polymerizing energy such as light or heat in the presence of a suitable initiator.

Reactive monomers, oligomers, and crosslinkers that contain acrylate or methacrylate functional groups are well known and commercially available from Sartomer, Radcure and Henkel. Similarly, vinyl ethers are commercially available from Allied Signal. Photo-initiators such as the Irgacure and Darocure series are well-known and commercially available from Ciba Geigy, as is the Escacure series from Sartomer. Thermal initiators such as azobisisobutyronitrile (AIBN), benzoyl peroxide, dicumyl peroxide, t-butyl hydroperoxide, potassium persulfate, and ammonium persulfate are also well known and are available from chemical suppliers such as Aldrich. Benzophenone, vinyl, diene, and allyl compounds are available from a large number of chemical suppliers. For a reference on initiators, see, for example, Polymer Handbook, J. Brandrup, E. H. Immergut, eds., $3_{rd}$ Ed., Wiley, New York, 1989. Below we will use acrylates (and in a few cases, methacrylates) to illustrate the flexibility of our formulation approach. Similar structures with other reactive groups based on either small or large molecule architectures (such as acrylamides, vinyl ethers, vinyls, dienes, and the like) can be used in conjunction with the disclosed casting process.

The compatibility of dead polymer-reactive plasticizer mixtures is demonstrated by checking the optical transparency of the resulting material at room temperature or slightly above. As a point of illustration of the great diversity of reactive plasticizers that can be used to achieve such compatibility, we will only name a few from a list of hundreds to thousands of commercially available compounds. For example, mono-functional entities include, but are not limited to: butyl acrylate, isooctyl acrylate, hexadecyl acrylate, stearyl acrylate, isobornyl acrylate, vinyl benzoate, tetrahydrofurfuryl acrylate (or methacrylate), caprolactone acrylate, cyclohexyl acrylate, benzyl acrylate, ethylene glycol phenyl ether acrylate, methyl methacrylate, hydroxyethyl acrylate, hydroxypropyl acrylate, polyethylene glycol acrylate, and the like. Bi-functional entities include, but are not limited to: polyethyleneglycol diacrylate, polypropyleneglycol diacrylate, hexanediol diacrylate, Photomer 4200 (from Henkel), polybutadiene diacrylate (or dimethacrylate), Ebecryl 8402 (from Radcure), bisphenol A diacrylate, and ethoxylated (or propoxylated) bisphenol A diacrylate. Tri-functional and multi-functional entities include, but are not limited to: trimethylolpropane triacrylate (and its ethoxylated or propoxylated derivatives), pentaerythritol tetraacrylate (and its ethoxylated or propoxylated derivatives), Photomer 6173 (a proprietary acrylated oligomer of multi functionality, from Henkel), and a whole host of aliphatic and aromatic acrylated oligomers from Sartomer (the SR series), Radcure (the Ebecryl series), and Henkel (the Photomer series). In addition to acrylate chemistry, styrene, substituted styrenes (such as, for example, chlorostyrene and methylstyrene), and other vinyl derivatives, vinyl ethers, and allyl-containing compounds can be used.

EXAMPLES

The following examples are provided to illustrate the practice of the present invention, and are intended neither to define nor to limit the scope of the invention in any manner.

Examples 1–8 below are designed to discover pairs of materials that exhibit thermodynamic compatibility for utilization in the core composition. Examples 9 to 11 show systems that remain optically clear upon photocuring, and further illustrate material systems exhibiting high refractive indices Tertiary, quaternary, and multi-component mixtures can be formulated based on knowledge gleaned from binary experiments. Generally, diluents that are small molecules have a higher degree of shrinkage. But, they are also typically better plasticizers. On the contrary, oligomeric plasticizers shrink less, but they also show less solvation power and less viscosity reduction. Hence, mixtures of reactive plasticizers can be prepared to give optimized compatibility, processing, and shrinkage properties.

Example 1

Experimental Protocol

Dead polymers are added to a vial, pre-filled with a small quantity of the intended reactive plasticizer. Gentle heating is applied while stirring homogenizes the mixture. The resulting semi-solid-like mass is observed visually and optical transparency at various temperatures is recorded. Complete clarity is indicative of component miscibility. A faint haze suggests partial miscibility, and opacity equates to incompatibility (light scattering as a result of phase separation). Many pairs of dead polymer-reactive plasticizers can thus be investigated.

Examples 2 to 8 report several findings of system compatibility and partial compatibility, following this procedure.

Example 2

Kraton-Based Systems

The following polymers are studied using the protocol described in Example 1. The accompanying table summarizes the polymer characteristics.

TABLE 1

| Krayton type | Composition (%) | Description |
|---|---|---|
| G 1652 | SEBS (S:29/EB:71) | linear, low molecular weight |
| G 1650 | SEBS (S:29/EB:71) | linear, medium Mw |
| G 1657 | SEBS (S:13/EB:87) | linear |
| D 1102 | SBS (S:28/B:72) | linear, low Mw |
| D 4141 | SBS (S:31/B:69) | linear |
| D 4240p | (SB)$_n$ (S:44/B:56) | branched |
| D 1116 | (SB)$_n$ (S:21/B:79) | branched |
| D 1107 | SIS (S:14/I:86) | linear |

S = styrene, EB = ethylene butylene, B = butadiene, I = isoprene

Hexanediol diacrylate solvates all Kraton samples well except for G 1650, which shows partial miscibility. Photomer4200 solvates D1102, D1107, D4141, D4240p, and G1657 at elevated temperatures. Photomer 4200 (an oligomeric diacrylate) solvates G 1652 partially. Polybutadiene dimethacrylate (Sartomer CN301) solvates D1116, D1102, and D4141 partially at elevated temperatures. Ebecryl 8402 solvates G 1657. Isodecyl acrylate is compatible with all of the above Kratons. Hexadecyl acrylate, lauryl acrylate, and stearyl acrylate solvate Kraton at elevated temperatures.

Other monomers that solvate Kraton include butyl acrylate, isooctyl acrylate, isobornyl acrylate, benzyl acrylate, tetrahydrofurfuryl acrylate, and vinyl benzoate. In general, aliphatic acrylates solvate rubbery Kraton well. Ethoxylated bisphenol A diacrylate (average molecular weight of 424) solvates Kraton D4240p, D1107, D4141, and D1102 only slightly.

Example 3
Styrene-Rich-SBS Systems

Kraton D1401P is a linear styrene-rich SBS tri-block copolymer. Reactive plasticizers that solvate Kraton D1401P include: vinyl benzoate; tetrahydrofurfuryl acrylate; benzyl acrylate; isobornyl acrylate; butyl acrylate; octyl acrylate; isodecyl acrylate; butanediol diacrylate; hexanediol diacrylate; and ethoxylated bisphenol A diacrylate.

To obtain thermodynamically compatible systems containing styrene-rich SBS tri-block copolymers, Kraton D1401P can be replaced by other SBS copolymers such as those that are commercially available from Phillips Chemical Company (K-Resin), BASF (Styrolux), Fina Chemicals (Finaclear), and Asahi Chemical (Asaflex).

Example 4
PMMA-Based Systems

This study is conducted with a polymethyl methacrylate (PMMA) sample of molecular weight 25,000. Many reactive plasticizers have been found compatible with PMMA. These are: Photomer 4200; Photomer 6173; many alkoxylated multifunctional acrylate esters, such as propoxylated glycerol triacrylate; urethane acrylates, such as Ebecryl 8402 (aliphatic) and Ebecryl 4827, 4849 and 6700 (aromatic); tetrahydrofurfuryl acrylate; benzyl acrylate; butyl acrylate; butanediol diacrylate; hexanediol diacrylate; octyldecyl acrylate; isobornyl acrylate; and ethoxylated bisphenol A diacrylate.

Example 5
Polystyrene-Based Systems

Acrylated plasticizers that solvate polystyrene include Photomer 4200, tetrahydrofurfuryl acrylate, isodecyl acrylate. Bisphenol A diacrylate, hexadecyl acrylate, and stearyl acrylate exhibit compatibility at elevated temperatures (approximately 100° C. for example).

Example 6
Polycarbonate-Based Systems

Bisphenol A diacrylate, alkoxylated bisphenol A diacrylate, cycloaliphatic epoxy resin, N-vinyl-2-pyrrolidinone, and tetrahydrofurfuryl acrylate, among others, have been found useful for the solvation of polycarbonate at elevated temperature. Several aromatic urethane acrylates can be mixed with the above compounds to aid the compatibility of the ingredients.

Example 7
ARTON-Based Systems

Reactive plasticizers that solvate ARTON FX4727T1 (JSR Corporation) are: benzyl acrylate; isobornyl acrylate; isobornyl methacrylate; butyl acrylate; octyl acrylate; isooctyl acrylate; isodecyl acrylate; lauryl acrylate; behenyl acrylate. Aliphatic acrylates solvate ARTON very well.

Example 8
ZEONEX-Based Systems

Octyldecyl acrylate, butyl acrylate, and isooctyl acrylate solvate Zeonex 480R (Nippon Zeon Co., Ltd). Isobornyl acrylate solvates Zeonex 480R and E48R, and Zeonor 1420R, 1020R and 1600R. Lauryl acrylate and behenyl acrylate solvate ZEONEX 480R and E48R at elevated temperature.

Example 9
Transparent Photo-cured Systems

Mixtures containing the dead polymer, reactive plasticizer, and photoinitiator were mixed by the protocol described in Example 1. The amount of reactive plasticizer was typically 3% to 25% and the photoinitiator was 1% to 5% by weight. Example photoinitiators include Esacure KT046 from Sartomer and Irgacure 184 from Ciba Geigy.

The resulting semi-solid composition was slightly heated (less than or equal to about 100° C.), pressed between flat glass plates, and flood-exposed by UV light. Rapid polymerization was observed that led to a clear and solid-like material.

The examples of transparent photo-cured systems included: Kraton D1401P-based systems reported by Example 3; PMMA-based systems reported by Example 4; ARTON-based systems reported by Example 7. Kraton D1401P-based systems also showed exceptional impact-resistance.

Example 10
Transparent Photo-cured Systems Having a High Refractive Index

A mixture containing a dead polymer, reactive plasticizer, and photoinitiator was mixed by the protocol described in Example 1, and was processed further as described in Example 9. The dead polymer was Kraton D1401P and the reactive plasticizer was benzyl acrylate, mixed at a ratio by weight of 88/12. Irgacure 184 was added to the mixture at 2 wt % based on the overall weight of the system. Upon UV cure, a flat sample having a thickness of 2.4 millimeters was produced, which showed 88% light transmittance at a wavelength of 700 nm. The refractive index of the cured sample was 1.578 at the sodium D line at room temperature.

Example 11
Transparent Systems Utilizing a Waiting Period

Kraton D1401P and isooctyl acrylate were added to a glass vial in the weight ratio 93/7. The capped vial was allowed to sit overnight. After 24 hours, the mixture was a clear, semi-solid mass. Irgacure 184 was added to the mixture at 2 wt % (based on the overall weight of the system), and was dissolved into the system while slightly heating and mixing manually. The resulting semi-solid mass was processed further as described in Example 9. Upon UV cure, a flat sample having a thickness of 2.3 millimeters was produced, which showed 90% light transmittance at a wavelength of 700 nm. The refractive index of the cured sample was 1.574 at the sodium D line at room temperature.

Examples 12–17 below illustrate preparation of articles having an integral, but different, surface and core.

Example 12

Lens with an Integral Scratch-Resistant Surface

A viscous blend of Kraton (70% by weight), bisphenol A diacrylate (10% by weight), vinyl benzoate (10% by weight), and hexanediol diacrylate (10% by weight) is mixed and processed through a twin-screw extruder. Also added to the mixture is a small amount of a UV initiator (0.5% by weight). Either the Darocure or the Irgacure series, or other equivalent compounds, can be used as the initiator. The discharge is pressed into simple piano (Base 4, 6, or 8) pre-forms and cooled for storage. Just before final cure, the pre-forms are dipped into a bath containing a 50:50 pentaerythritol tetraacrylate and trimethylolpropane triacrylate mixture, the bath being at from about room temperature to about 35° C. These crosslinker molecules with high functionality are imbibed by the pre-forms. Depending on the duration of dip, surface penetration of the solution occurs to different extents. Such surface-modified pre-forms are then sandwiched between two mold halves having the exact contours necessary for the desired prescription lens. The temperature of the mold may be held at room temperature, or it is heated to a temperature up to about 80° C. The whole assembly is exposed to UV with optional heat cure (from an infrared source or a conventional oven). When the whole system is fully cured, the mold is opened and the scratch-protected lens is recovered. The method of preparation eliminates the use of gaskets, eases handling, and creates a monolithic object having an integral scratch-resistant surface layer.

Example 13

Shatter-Resistant Sheet with Integral Scratch-Resistant, Anti-Fogging Surface

Kraton (80%) is blended with an aliphatic diacrylate (Henkel Photomer 4200) (20%) in a heated tank equipped with a rotary blade assembly designed for viscous mixing. A small amount of a thermal initiator such as benzoyl peroxide, dicumyl peroxide, or t-butyl hydroperoxide is also added. The discharge from the tank is squeezed through a pair of calender rolls to produce a continuous sheet. The thickness of the sheet is determined by the separation of the roller at the nip region. The flat sheet is sprayed from both sides with a solution of ethoxylated pentaerythritol tetraacrylate, ethoxylated trimethylolpropane triacrylate, a hexafunctional urethane acrylate, and hydroxyethyl methacrylate in the composition ratio of 45:45:8:2. If used neat, the temperature of the surface-forming solution is about 30–50° C.; if used with a volatile solvent such as acetone or isopropanol, the solution is at room temperature. The coated sheet is then passed through a heated zone, whereupon the surface and core materials are both rapidly cured and fused together. (Strong UV can optionally be used to augment the rate of cure. In this case, a UV initiator is added to both the core and the surface compositions). This continuous production technology yields transparent, shatter-resistant, and scratch-resistant plastic sheets with moderate anti-fogging properties.

Example 14

Contact Lens with High Oxygen Permeability and Tissue Compatibility

Acrylated polybutadiene is mixed with a small amount of hexanediol diacrylate in the composition ratio of 90:10 by weight. To this mixture is added a UV initiator at a loading level of approximately 0.1% to 0.5%. Cylindrical buttons are cut out of a long extrudate of this mixture. The buttons are soaked in a hydroxyethyl methacrylate and polyethyleneglycol diacrylate solution containing any of several choices of dyes (blue, green, UV-blocking, photochromic, etc.), which solution can be at about room temperature up to about 50° C. The over-coated buttons are then dropped into a mold cavity, whereupon the mold (at about room temperature or heated to up to about 50° C.) is closed and the content is cured by UV and heat. Upon process completion, the contact lens thus produced is a monolithic article that exhibits high oxygen permeability, tissue compatibility, and selected designer color or photochromic features.

Example 15

Monolithic Drug Delivery Implant Having Tissue Compatibility

A slow- or controlled-release drug delivery implant is prepared by forming a loose polymer network of, for example, substituted cellulosics, dextran, starch or polyethyleneglycol diacrylate. The desired drug is entrapped in the polymer matrix by various methods known in the drug delivery arts. This impregnated implant "pre-form" can then be stored. Just before use, the preform is dipped into a room-temperature solution of a surface-forming composition that imparts tissue compatibility, such as hydroxyethylmethacrylate or polyethylene glycol diacrylate mixture, and the resulting gradient composite material is cured. In one form of the implant, the surface is drug-impermeable after cure and an orifice is made in the surface (by drilling, punching, or laser burn, for example) to provide an exit for release of the drug. In another form of the implant, the surface after cure is permeable to the drug so that the drug may diffuse from the device.

Example 16

Lens with Integral Anti-Glare Surface

A viscous blend of Kraton (70% by weight), bisphenol A diacrylate (10% by weight), vinyl benzoate (10% by weight), and hexanediol diacrylate (10% by weight) is mixed and processed through a twin-screw extruder. Also added to the mixture is a small amount of a UV initiator (0.5% by weight). Either the Darocure or the Irgacure series, or other equivalent compounds, can be used as the initiator. The discharge is pressed into simple piano (Base 4, 6, or 8) pre-forms and cooled for storage. Just before final cure, the pre-forms are dipped into a bath (at from about room temperature to about 35° C.) containing partially fluorinated octylacrylate (70% by weight), laurylacrylate (20% by weight), and hexanediol diacrylate (10% by weight), together with a small amount of a UV initiator to trigger polymerization. Depending on the duration of dip, surface penetration of the solution occurs to different extents. Such surface-modified pre-forms are then sandwiched between two mold halves having the exact contours necessary for the desired prescription lens. The whole assembly is exposed to UV with optional heat cure (from an infrared source or a conventional oven). When the whole system is fully cured, the mold is opened and the surface-modified lens is recovered. The monolithic lens that is produced has an integral anti-glare surface.

Example 17
Photochromic Contact Lens with High Oxygen Permeability and Tissue Compatibility Acrylated polybutadiene is mixed with a small amount of hexanediol diacrylate in the composition ratio of 90:10 by weight. To this mixture is added a UV initiator at a loading level of approximately 0.1% to 0.5%. Cylindrical buttons are cut out of a long extrudate of this mixture. The buttons are soaked in a hydroxyethyl methacrylate and polyethyleneglycol diacrylate solution containing spiropyran as the photochromic dye, which solution is at about room temperature up to about 50° C. The over-coated buttons are then dropped into a mold cavity, whereupon the mold (at about room temperature or heated to up to about 50° C.) is closed and the content is cured by UV and heat. Upon process completion, the contact lens thus produced is a monolithic article that is photochromic and exhibits high oxygen permeability and tissue compatibility.

What is claimed is:

1. A method of forming an article having a surface and an interior core, the method comprising the steps of:
   mixing together components comprising a dead polymer, a reactive plasticizer, an initiator to form a semi-solid polymerizable core composition;
   exposing the core composition to a surface-forming composition and allowing penetration and diffusion of the surface-forming composition into the core composition to form a semi-solid gradient composite material;
   exposing the gradient composite material to a source of polymerizing energy; and
   retrieving the resultant article having a surface and an interior core, wherein the composition of the core material comprises a semi-interpenetrating crosslinked polymer network of reactive plasticizer within an entangled dead polymer, and wherein the composition at the surface of the resultant article is distinct from the composition at the center of the interior core.

2. The method of claim 1 which further comprises, prior to exposing the core composition to the surface-forming composition, the steps of applying the surface-forming composition to a mold and placing the core composition into the mold; and wherein exposing of the core composition to the surface-forming composition to the core composition is effected by closing the mold.

3. The method of claim 1 which further comprises, prior to exposing the gradient composite material to a source of polymerizing energy, the step of shaping the semi-solid gradient composite material into a desired geometry.

4. The method of claim 3, wherein said mixing comprises at least one waiting period in which the dead polymer, the reactive plasticizer, and the initiator are not mechanically agitated, wherein said waiting period is at least about one hour and not more than about 48 hours in length.

5. The method of claim 1, in which the components of the semi-solid polymerizable composition further comprise an additive selected from the group consisting of anti-oxidants and stabilizers.

6. The method of claim 1, further comprising shaping the core composition into a desired geometry prior to exposing the core composition to the surface-forming composition.

7. The method of claim 2, further comprising curing or partially curing the surface-forming composition prior to exposing the core composition to the surface-forming composition.

8. The method of claim 1, wherein the dead polymer is a member selected from the group consisting of a thermoplastic elastomer, an engineering thermoplastic, and a polycarbonate.

9. The method of claim 1, wherein the surface-forming composition comprises a member selected from the group consisting of dyes, pigments, scratch-resistant materials, hydrophilic monomer/crosslinker mixtures, anti-static material, monomers that when polymerized produce a surface layer having a low refractive index relative to said core composition when polymerized, crosslinkers that when polymerized produce a surface layer having a low refractive index relative to said core composition when polymerized, fluorescent materials, phosphorescent materials, UV-absorbing materials, anti-oxidants, free-radical scavengers, and heterofunctional additives with additional reactive groups.

* * * * *